(12) United States Patent
Middendorf

(10) Patent No.: US 10,227,904 B2
(45) Date of Patent: Mar. 12, 2019

(54) USE OF A LUBRICANT IN A MOUNTING MAT, METHOD FOR MAKING SUCH A MAT AND MOUNTING MAT

(71) Applicant: 3M INNOVATIVE PROPERTIES COMPANY, St. Paul, MN (US)

(72) Inventor: Claus Middendorf, Neuss (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/109,839

(22) Filed: Aug. 23, 2018

(65) Prior Publication Data

US 2018/0363522 A1 Dec. 20, 2018

Related U.S. Application Data

(62) Division of application No. 14/917,986, filed as application No. PCT/US2014/053670 on Sep. 2, 2014, now Pat. No. 10,077,692.

(30) Foreign Application Priority Data

Sep. 12, 2013 (EP) .................................. 13184194

(51) Int. Cl.
*F01N 3/28* (2006.01)
*F01N 3/021* (2006.01)
(Continued)

(52) U.S. Cl.
CPC ........... *F01N 3/021* (2013.01); *D04H 1/4209* (2013.01); *D04H 1/4218* (2013.01); *D04H 1/46* (2013.01);
(Continued)

(58) Field of Classification Search
CPC ...... F01N 3/2853; F01N 3/2011; F01N 3/021; F01N 2350/04; F04H 1/4218
(Continued)

(56) References Cited

U.S. PATENT DOCUMENTS 3,001,571 A 9/1961 Hatch
3,709,706 A 1/1973 Sowman
(Continued)

FOREIGN PATENT DOCUMENTS

CN 101115688 1/2008
CN 102496701 6/2012
(Continued)

OTHER PUBLICATIONS

Klamann, "Lubricants and Related Products," Ullmann's Encyclopedia of Industrial Chemistry, vol. A15, pp. 423-511.
(Continued)

*Primary Examiner* — Tom P Duong
(74) *Attorney, Agent, or Firm* — Harold C. Knecht, III

(57) ABSTRACT

The invention refers to the use of lubricants in a mounting mat, wherein the mounting mat is made for mounting a pollution control element into a housing, to reduce the cold peak pressure or compression of the mounting mat, the mounting mat comprising:
   a non-woven mat of inorganic fibers, wherein
   the lubricants are distributed in the mat, and wherein
   the lubricants belong to a group consisting of:
   saturated hydrocarbons (linear and/or branched and/or cyclic,
   olefinically unsaturated hydrocarbons (linear and/or branched and/or cyclic),
   fatty alcohols and fatty acids (linear and/or branched and saturated and/or olefinically unsaturated),
   carboxylic acid esters
   carbonic acid esters and/or
   silicone oils and/or organofunctional silanes, siloxanes.

20 Claims, 6 Drawing Sheets

(51) Int. Cl.
*D04H 1/4209* (2012.01)
*D04H 1/46* (2012.01)
*D04H 1/4218* (2012.01)

(52) U.S. Cl.
CPC .......... *F01N 3/0211* (2013.01); *F01N 3/2853* (2013.01); *F01N 2350/04* (2013.01); *Y02T 10/20* (2013.01)

(58) Field of Classification Search
USPC ......... 422/179, 180; 29/890; 501/95.1, 95.2; 428/221
See application file for complete search history.

(56) References Cited

U.S. PATENT DOCUMENTS

| | | | |
|---|---|---|---|
| 3,916,057 A | | 10/1975 | Hatch et al. |
| 4,305,992 A | | 12/1981 | Langer et al. |
| 4,385,135 A | | 5/1983 | Langer et al. |
| 4,957,559 A | | 9/1990 | Tiesler et al. |
| 5,207,989 A | | 5/1993 | MacNeil |
| 5,242,871 A | | 9/1993 | Hashimoto et al. |
| 5,250,269 A | * | 10/1993 | Langer ................. B01D 53/885 422/179 |
| 5,254,410 A | | 10/1993 | Langer et al. |
| 5,290,522 A | | 3/1994 | Rogers et al. |
| 5,385,873 A | | 1/1995 | MacNeil |
| 5,671,518 A | | 9/1997 | Kummermehr et al. |
| 5,885,390 A | | 3/1999 | Alkire et al. |
| 5,900,206 A | | 5/1999 | Pellegrin et al. |
| 5,947,158 A | | 9/1999 | Gross et al. |
| 5,955,177 A | * | 9/1999 | Sanocki ................. C03C 25/42 427/282 |
| 6,960,386 B2 | * | 11/2005 | Agata ................. B01D 53/9454 29/890 |
| 8,071,040 B2 | | 12/2011 | Beauharnois et al. |
| 9,759,112 B2 | | 9/2017 | Tomosue et al. |
| 2006/0153746 A1 | | 7/2006 | Merry et al. |
| 2007/0065349 A1 | | 3/2007 | Merry |
| 2007/0084171 A1 | * | 4/2007 | Kaneko ............... C04B 38/0006 55/523 |
| 2009/0041820 A1 | | 2/2009 | Wu et al. |
| 2009/0041967 A1 | * | 2/2009 | Tomosue ............. F01N 3/2853 428/36.8 |
| 2009/0304560 A1 | | 12/2009 | Dietz |
| 2010/0150791 A1 | * | 6/2010 | Kunze ................. C04B 41/009 422/179 |
| 2010/0207298 A1 | * | 8/2010 | Kunze ................. D04H 1/4218 264/321 |
| 2011/0201243 A1 | | 8/2011 | Miele et al. |
| 2014/0308505 A1 | | 10/2014 | Schmitt |

FOREIGN PATENT DOCUMENTS

| | | |
|---|---|---|
| DE | 4205601 | 8/1993 |
| EP | 0374671 | 6/1990 |
| EP | 0374672 | 6/1990 |
| EP | 0386636 | 9/1990 |
| EP | 0386638 | 9/1990 |
| EP | 0535074 | 4/1993 |
| EP | 0710631 | 5/1996 |
| GB | 1522646 | 8/1978 |
| JP | 2604873 | 11/1991 |
| JP | 2000344583 | 12/2000 |
| JP | 2002173875 | 6/2002 |
| JP | 2008248441 | 10/2008 |
| JP | 2011169325 | 9/2011 |
| WO | WO 91/18958 | 12/1991 |
| WO | WO 93/15246 | 8/1993 |
| WO | WO 94/16134 | 7/1994 |
| WO | WO 01/83394 | 11/2001 |
| WO | WO 2004/011785 | 2/2004 |
| WO | WO 2007/143437 | 12/2007 |
| WO | WO 2009/048854 | 4/2009 |
| WO | WO 2009/048857 | 4/2009 |
| WO | WO 2009/048859 | 4/2009 |

OTHER PUBLICATIONS

International Search report for PCT International Application No. PCT/US2014/053670, dated Nov. 28, 2014, 5 pages.

* cited by examiner

USE OF A LUBRICANT IN A MOUNTING MAT, METHOD FOR MAKING SUCH A MAT AND MOUNTING MAT

CROSS REFERENCE TO RELATED APPLICATIONS

This application is a divisional of U.S. Ser. No. 14/917,986, filed Mar. 10, 2016, which is a national stage filing under 35 U.S.C. 371 of PCT/US2014/053670, filed Sep. 2, 2014, which claims the benefit of European Application No. 13184194.2, filed Sep. 12, 2013, the disclosures of which are incorporated by reference in their entireties herein.

FIELD OF INVENTION

The invention relates to the use of a lubricant in a mounting mat, the mounting mat is made for mounting a pollution control element, to reduce the cold peak pressure or cold compression, a method for making a mounting mat with a lubricant and a mounting mat with a lubricant.

BACKGROUND

Pollution control devices are employed for example in motor vehicles like passengers' cars or trucks or in industrial applications to control atmospheric pollution. Such devices include a pollution control element. Exemplar pollution control elements include catalytic converters and diesel particulate filters or traps. Catalytic converters typically contain a ceramic monolithic structure having walls that support the catalyst. The catalyst typically oxidizes carbon monoxide and hydrocarbons, and reduces the oxides of nitrogen in the engine exhaust gases to control atmospheric pollution. Selective Catalytic Reduction (SCR) catalysts work by chemically reducing NOx (NO and NO2) to nitrogen (N2). The monolithic structure may also be made of metal. Diesel particulate filters or traps typically include wall flow filters that are often honeycombed monolithic structures made, for example, from porous ceramic materials. The filters typically remove soot and other exhaust particulate from the engine exhaust gases. Each of these devices have a housing (typically made out of stainless steel) that holds the pollution control element.

In automobile applications, monolithic pollution control elements are often described by their wall thickness and the number of openings or cells per square inch (cpsi). In the early 1970s, ceramic monolithic pollution control elements with a wall thickness of 12 mils (304 micrometers) and a cell density of 300 cpsi (47 cells/cm$^2$) were common ("300/12 monoliths").

As emission laws became more stringent, wall thickness have decreased as a way of increasing geometric surface area, decreasing heat capacity and decreasing pressure drop of the monolith. The standard has progressed to for example 900/2 monoliths. With their thin walls, monolithic structures are fragile and susceptible to vibration or shock damage and breakage. The damaging forces may come from rough handling or dropping during the assembly of the pollution control device, from engine vibration or from travel or rough roads. The monoliths are also subject to damage due to high thermal shock, such as from contact with road spray.

There is another future trend that should be mentioned, which is to use catalyst carriers showing reduced compressive strengths. For example, for diesel particulate filters the trend goes to high porosity filter substrates with a reduced isostatic strength (for example 0.8 to 1 bar). Rectangular extruded substrates used as catalyst carriers in SCR systems for non-road and stationary applications like rail, marine and industrial applications have a compressive strength at temperatures below 45° C. of about 1 bar.

The ceramic monoliths have a coefficient of thermal expansion generally about an order of magnitude less than the metal housing which contains them. For instance, the gap between the peripheral wall of the metal housing and the monolith may for example start at about 4 mm, and may increase by about 0.33 mm as the engine heats the catalytic converter monolithic element from 25° C. to a maximum operating temperature—in the automotive industry—of about 900° C. to about 530° C. Even though the metallic housing undergoes a smaller temperature change, the higher coefficient of thermal expansion of the metallic housing causes the housing to expand to a larger peripheral size faster than the expansion of the monolithic element. Such thermal cycling typically occurs hundreds or thousands of times during the life of the vehicle. Typical temperatures in for example selective catalytic reduction catalysts in marine applications are 250° C. to 550° C.

To avoid damage to the monoliths from road shock and vibrations, to compensate for the thermal expansion difference, and to prevent exhaust gases from passing between the monoliths and the metal housings (thereby bypassing for example the catalyst), mounting mats are disposed between the ceramic monoliths and the metal housings. The process of placing the monolith within the housing is also called canning and may include such steps as wrapping a sheet of mat material around the monolith, inserting the wrapped monolith into the housing, pressing the housing closed, and welding flanges along the lateral edges of the housing. Other processes insert the monolith together with the wrapped mounting mat into the already closed housing by using pressure.

Typically, the mounting mat materials include inorganic fibers, optionally intumescent materials, organic binders, fillers and/or other adjuvants. Known mat materials, used for mounting a monolith in a housing are described in, for example U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 5,242,871 (Hashimoto et al.), U.S. Pat. No. 3,001,571 (Hatch), U.S. Pat. No. 5,385,873 (MacNeil), and U.S. Pat. No. 5,207,989 (MacNeil), GB U.S. Pat. No. 1,522,646 (Wood) published Aug. 23, 1978, Japanese Kokai No.: J.P. Sho. 58-13683 published Jan. 26, 1983 (i.e., Pat Appln Publn No. J.P. Hei. 2-43786 and Appln No. J.P. Sho. 56-1 12413), and Japanese Kokai No.: J.P. Sho. 56-85012 published Jul. 10, 1981 (i.e., Pat. Appln No. Sho. 54-168541). WO 2007/143,437 A2 discloses a multilayer mounting mat comprising fibers that may be sized to provide lubricity and to protect the fiber strands during manufacturing of the mat. WO 94/16,134 discloses a flexible nonwoven mat comprising ceramic oxide fibers. To facilitate processing and separation of the fibers, an antistatic lubricant may be provided. WO 2009/048,859 discloses a method of making mounting mats. In one embodiment the fibers are impregnated.

Mounting mat materials should remain very resilient at a full range of operating temperatures over a prolonged period of use. At the same time they should be designed such that the pollution control system may easily be mounted which may be a problem, if for example fragile structures need to be mounted and/or if squared substrates, where only a limited pressure can be applied, need to be mounted. Particularly, when multiple substrates are mounted together in one housing the canning force needs to be higher. The ease of mounting strongly depends on the cold peak pressure or cold peak compression (P0) of the mat. In the following only cold peak pressure will be used for this parameter. Mounting mats with high cold peak pressure may be difficult to mount at the desired mat mount density. Consequently, there is a need for mounting mats with reduced cold peak pressure which will still provide sufficient holding force in hot applications to prevent monolith movement.

In view of the above, there is a need for further improvements concerning the ability of easily mounting exhaust gas after-treatment element or pollution control systems.

SUMMARY OF INVENTION

According to the invention, it has been surprisingly found that the use of at least one lubricant from selected classes, which is distributed in a mounting mat made for mounting a pollution control element into a housing, reduces the cold peak pressure of the mounting mat in such a way, that the assembly of the exhaust gas after-treatment or pollution control system is much easier. The lubricant classes—from which the at least one lubricant may be selected belongs to a group consisting of:
- saturated hydrocarbons (linear and/or branched and/or cyclic,
- olefinically unsaturated hydrocarbons (linear and/or branched and/or cyclic),
- fatty alcohols and fatty acids (linear and/or branched and saturated and/or olefinically unsaturated),
- carboxylic acid esters
- carbonic acid esters and/or
- silicone oils and organofunctional silanes, silioxanes (e.g. aminofunctional), wherein the lubricant has a viscosity between 10 and 200 mm$^2$/s at 40° C., more preferably between 25 and 150 mm$^2$/s at 40° C.

The advantage of the invention is especially true for fragile monolith structures, e.g. ceramic structures and/or for squared monolithic substrates and/or when multiple substrates are mounted together in one housing and the canning forces need to be higher. At the same time it was found that the hot cyclic pressure (P1000) of the mounting mat stays essentially the same if one of the above lubricants was used to reduce the cold peak pressure. In other words the hot cyclic pressure is essentially not influenced by the use of a lubricant distributed in the mat to reduce the cold peak pressure. The inventive finding may be explained as follows. The lubricant according to the invention reduces the friction between fibers, when it is distributed in the mounting mat. The fibers therefore may slide within the mat relative to each other such that the cold peak pressure is lowered. The hot cyclic pressure is also good at high temperatures (e.g. 500° C.), where the lubricants are degraded and their lubricant properties are gone.

A mounting mat according to the invention may be non woven fabrics made out of inorganic fibers as described in the above list of patents. They may be made by any kind of known methods for making mounting mats like for example by dry-laid or wet-laid processes.

A pollution control element or an exhaust gas after treatment element according to the invention may be any kind of device that is used to reduce the amount of unwanted ingredients in exhaust gases of for example vehicles or industrial machines. Typical examples of pollution control elements are catalytic converters or diesel particulate filters. Catalytic converters typically contain a ceramic monolithic structure having walls that support the catalyst. The catalyst typically oxidizes carbon monoxide and hydrocarbons, and reduces the oxides of nitrogen in the engine exhaust gases to control atmospheric pollution. The monolithic structure may also be made of metal. Diesel particulate filters or traps typically include wall flow filters that are often honey-combed monolithic structures made, for example, from porous ceramic materials. The filters typically remove soot and other exhaust particulate from the engine exhaust gases. Each of these devices have a housing (typically made out of stainless steel) that holds the pollution control element.

A lubricant according to the invention is a substance introduced to reduce the friction between moving surfaces, here introduced into the mat to reduce friction between fibers within the mat. Lubricants typically do that by separating moving parts (fibers) in a system (mat). This causes the reduction of friction between the fibers, since the lubricant provides a physical barrier between the moving parts by providing a thin layer of lubricant.

Suitable lubricant components of organic origin may be selected from the broad range of organic lubricating compounds which may comprise both pure hydrocarbons and also corresponding hydrocarbon compounds containing functional groups which, for example, initiate surface adhesions or other known effects that are known for lubrication purposes. Basically, suitable lubricants may be assigned to the following classes of compounds or mixtures thereof: saturated hydrocarbons (linear, branched and/or cyclic), olefinically unsaturated hydrocarbons (linear, branched and/or cyclic); fatty alcohols (linear and/or branched and saturated and/or olefinically unsaturated); carboxylic acid esters, for example triglycerides, carbonic acid esters, polyesters, silicone oils, organofunctional silanes and siloxanes or other functionalized hydrocarbon compounds.

In addition, general expert knowledge of lubricants and related products is relevant in this regard, cf. for example "Ullmann's Encyclopedia of Industrial Chemistry", 5$^{th}$ Edition, Volume A15, and the abstract entitled "Lubricants and Related Products" on pages 423 to 511, Dieter Klamann, Hamburg, and the literature additionally cited in this regard.

The group of saturated hydrocarbons (linear and/or branched and/or cyclic) comprise for example alkanes and/or cycloalkanes. The group of olefinacally unsaturated hydrocarbons (linear and/or branched and/or cyclic) comprise for example alkenes, cyclic alkenes and/or alkines. In the group of fatty alcohols and fatty acids (linear and/or branched and saturated and/or olefinically unsaturated) particularly preferred alcohols are those in the C12-C30 range and, more particularly, those in the C12-C24 range. Particular emphasis is placed in this regard on mono-olefinically and/or polyolefinically unsaturated C16-24 fatty alcohols and/or C12-20 Guerbet alcohols. Preferred esters are corresponding esters of monobasic and/or polyhydric alcohols, corresponding esters of linear, optionally olefinically unsaturated mono-carboxylic acids of the fatty range (above all C12-24) being particularly preferred. Suitable esters for carboxylic acid esters are described in European patents EP 0 374 671, EP 0 374 672, EP 0 386 638, EP 0 386, 636 and EP 535 074. Polyester oils are organic components which are distinguished by a pronounced lubricating effect. The carbonic acid esters are described in EP 0 532 570. Examples for organofunctional silanes, siloxanes are amino-functional silanes or siloxanes.

The lubricants according to the invention are distributed in the mounting mat, which may mean that they are more or less evenly distributed within the mat. As described above, the effect according to the invention may be explained by reducing the friction between fibers. This effect is higher when the lubricants are evenly distributed within the mat. The lubricant according to the invention can have a viscosity between 10 and 200 mm²/s at 40° C., more preferably between 25 and 150 mm²/s at 40° C. The lubricant according to the invention may be based upon renewable resources such as seed oils and vegetable oils.

The mounting mat may include ceramic fibers, such as for example annealed melt-formed ceramic fibers, sol-gel formed ceramic fibers, polycrystalline fibers, glass fibers alumina-silica fibers, non-biopersistent alkaline-earth-silicate fibers (for example "ISOFRAX" from Unifax) and/or combinations thereof.

The method for making mounting mats according to the invention may be made by any known process for making mounting mats for mounting pollution control elements. Possible processes are a dry laid process or a wet laid process. One example for a dry laid process is a process using a conventional web forming machine such as those commercially available from Rando Machine Corp. (Macedon, N.Y.) under the trade designation "RANDO WEBBER" or from Scan web Co. (Denmark) under the trade designation "DAN WEB". An example for a wet laid process is a process where the web is formed from a slurry containing fibers and additives.

The mounting mat according to the invention may comprise binder. The amount of binder may be in the range of 1-10 wt %, preferably 3-6 wt %.

The lubricants according to the invention may be contained in the mounting mat in an amount of at least 0.5% by weight, or more preferably at least 1.0% by weight. Below 0.5% by weight the reduction of cold pressure (P0) is negligible. The lubricants according to the invention may for example be contained in the mounting mat in an amount of 3% by weight.

The lubricants according to the invention may contain additives. A possible additive package may comprise at least one of a stabilizer (e.g. an antioxidant), a corrosion inhibitor, an emulsion breaker and an anti-wear additive. The additive package typically provides an improvement, relative to an identical composition save for absence of the additive package, in one or more of oxidation resistance, thermal stability, anti-rust performance, extreme pressure anti-wear performance, anti-foam characteristics, air release properties and filtration. A particularly suitable additive package is available from Lubrizol Corporation under the trade designation L5186B. Typically, additives are present in amounts totaling from about 0.001 wt % to about 20 wt % based on total lubricant composition.

The mounting mat according to the invention can be disposed between the pollution control element and the housing when mounting the pollution control element into the housing.

The invention also relates to a method of making a mounting mat, which is made for mounting a pollution control element into a housing, the method comprising the following steps:
  supplying fibers through an inlet of a forming box having an open bottom positioned over a forming wire to form a mat of fibers on the forming wire, the forming box having a plurality of fiber separating rollers provided in at least one row in the housing between the inlet and housing bottom for breaking apart clumps of fibers and an endless belt screen;
  (ii) capturing clumps of fibers on a lower run of the endless belt beneath fiber separating rollers and above the forming wire;
  (iii) conveying captured clumps of fibers on the endless belt above fiber separating rollers to enable captures clumps to release from the belt and to contact and be broken apart by the rollers;
  (iv) transporting the mat of fibers out of the forming box by the forming wire; and
  (v) compressing the mat of fibers and restraining the mat of fibers in its compressed state thereby obtaining a mounting mat having a desired thickness suitable for mounting a pollution control element in the housing of a catalytic converter, wherein
  (vi) providing at least one lubricant to the fibers before, during or after forming the mat.

The compression step may be any known compression step in the area of making mounting mats for mounting pollution control elements, such as for example a needle punching, stitch bonding step and/or thermal bonding using pressure to reduce the thickness of the mat. The thermal compression may use polyolefinic fibers or powders to activate a binder and may include using a press to reduce the thickness of the mat to the desired thickness.

The lubricant may be provided by spraying it onto the fibers before they enter the forming chamber. It is also possible that the lubricant is provided by spraying it into the forming chamber. Lubricants can also be applied differently from the previously described. Fibers might have already have lubricant applied to them before bringing them into the mat forming process e.g. at the fiber manufacturer or in any other process step. The lubricant can preferably be sprayed in any pipe that conveyors the fiber between machines or at the end of a duct where the air is separated from the fiber so the fiber can fall by gravity into the next machine in the process or while fibers are conveyored on a transportation belt. The additive might also be added directly into the forming chamber to be well mixed with the material selected to form a mat or onto the nonwoven after forming at any time before or after bonding the fiber independently from the bonding method. When spraying the lubricants onto the mat of fibers after leaving the forming chamber, the lubricant needs to be adapted such that it penetrates into the mat to be distributed within the mat of fibers.

The invention also comprises a mounting mat made for mounting a pollution control element into a housing, the mounting mat comprising:
  a non-woven mat of inorganic fibers and
  lubricants, which are distributed in the mat;
  wherein the lubricants belong to a group consisting of:
  saturated hydrocarbons (linear and/or branched and/or cyclic,
  olefinically unsaturated hydrocarbons (linear and/or branched and/or cyclic),
  fatty alcohols and fatty acids (linear and/or branched and saturated and/or olefinically unsaturated),
  carboxylic acid esters
  carbonic acid esters and/or
  silicone oils and organofunctional silanes, silioxanes (e.g. aminofunctional).

BRIEF DESCRIPTION OF DRAWINGS

The invention will now be described in more detail with reference to the following Figures exemplifying particular embodiments of the invention.

DETAILED DESCRIPTION

Figure 1:
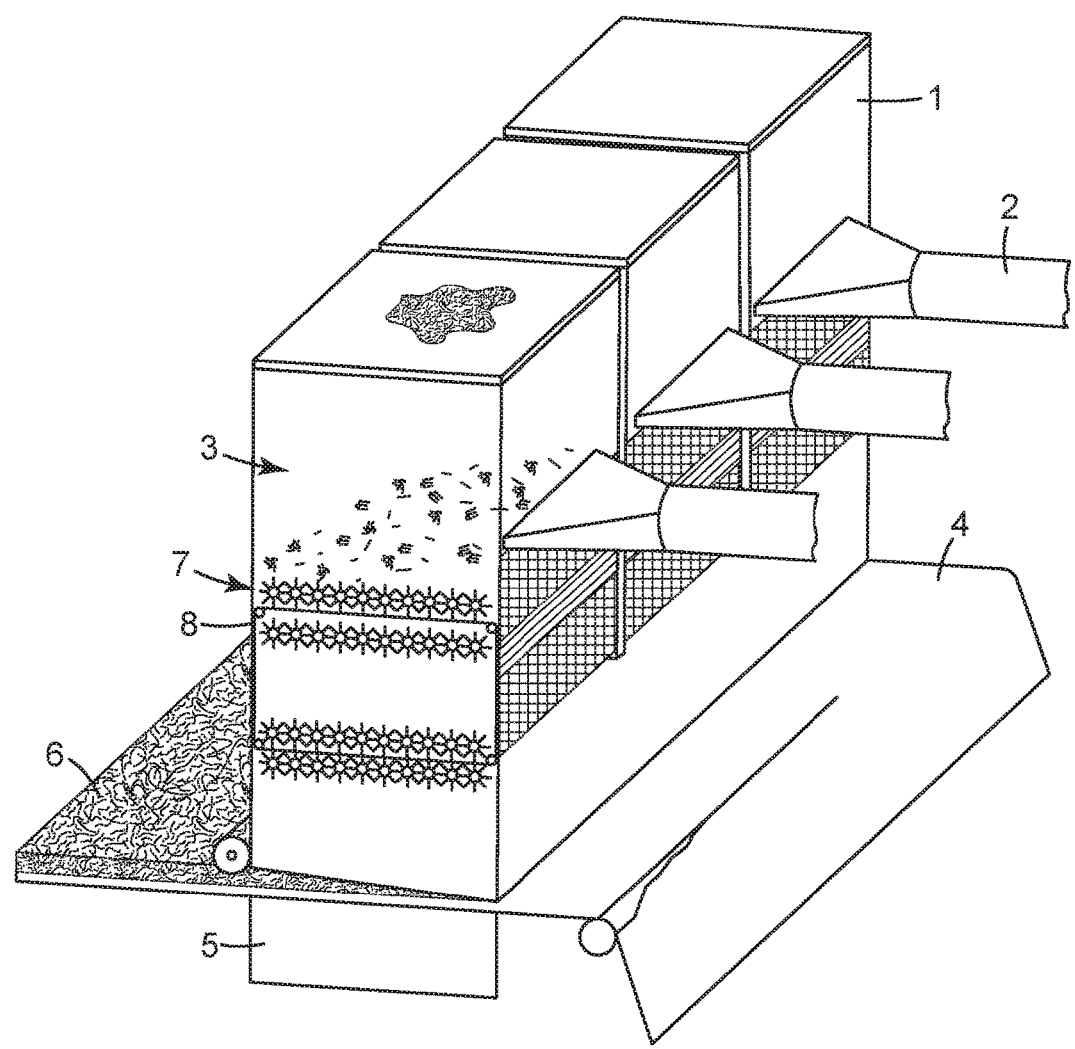
FIG. 1 shows a schematic perspective view of a forming box.

Herein below various embodiments of the present invention are described and shown in the drawings wherein like elements are provided with the same reference numbers.

Figure 2:
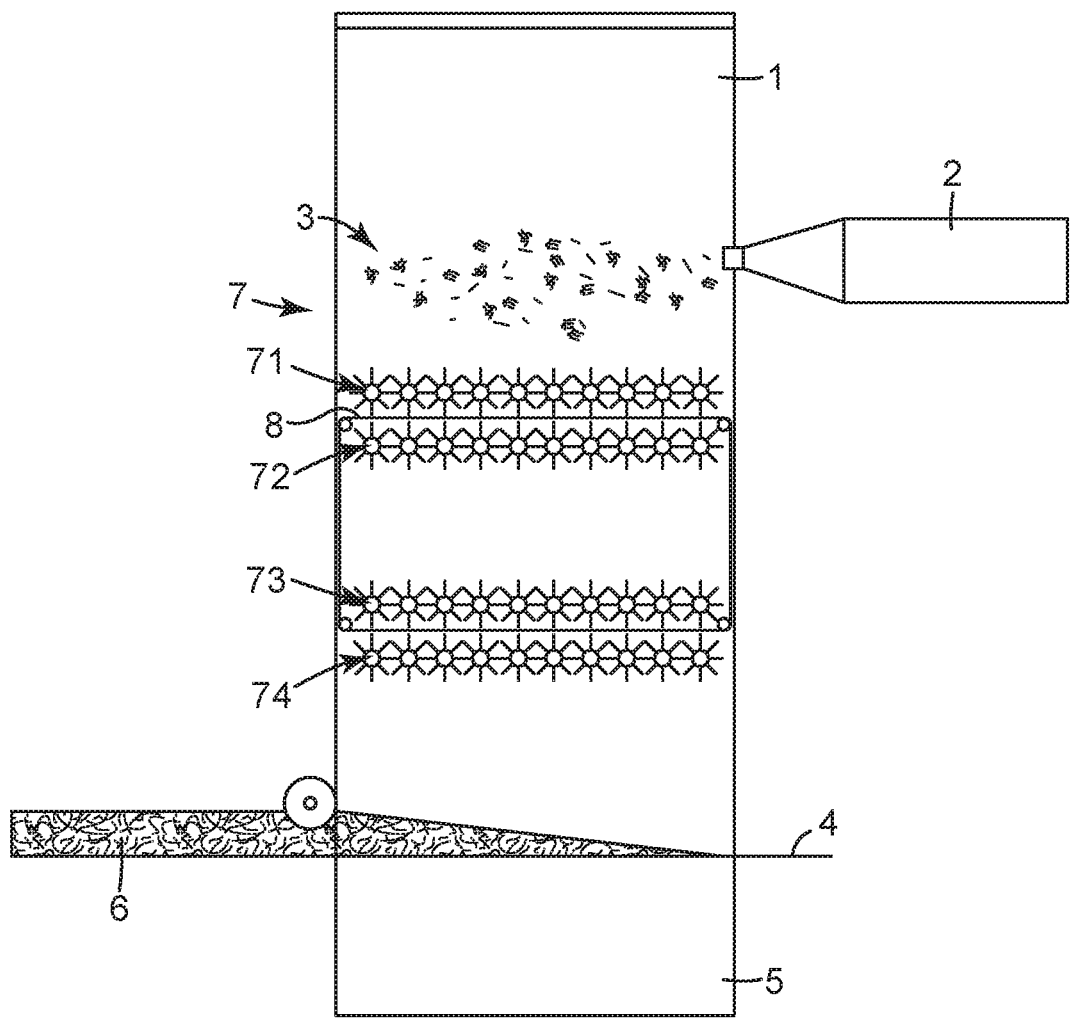
FIG. 2 shows a schematic side view of a forming box.

In FIG. 1 and FIG. 2, a forming box for making mounting mats according to the invention is shown. The forming box comprises a housing 1 into which fibers 3 are supplied from an inlet 2. The forming box is positioned above a forming wire 4 onto which the fibers 3 are air laid due to a vacuum box 5 underneath the forming wire 4 to form a fiber board 6 in a dry forming process. In FIG. 1, the forming box is shown with the interior elements visible in the housing. However, it is realised that the housing walls may be made either from transparent or opaque materials.

The fibers 3 are blown into the housing 1 of the forming box via the inlet 2. Inside the forming box a number of spike rollers 7 are provided in one or more rows (e.g., four rows) of spike rollers 71, 72, 73, 74 as shown in FIG. 1 and FIG. 2. In the housing 1, an endless belt screen 8 is also provided. This endless belt screen 8 is provided with a conveying path including an upper run 85, a vertical section 88 where the belt screen 8 moves in a downwards direction, in a lower run 86 where the belt screen 7 travels substantially parallel with the underlying forming wire 5 and an upwardly oriented run 87, as shown in FIG. 3.

Adjacent the upper run 85 of the belt screen 8, at least one row of spike rollers 71 is provided. In the embodiment shown two upper rows of spike rollers 71, 72 and two lower rows of spike rollers 73, 74 are provided at different levels in the housing 1. The belt screen is arranged with an upper run path 85 between the two upper rows of spike rollers 71, 72 and the lower run path 86 between the lower rows of spike rollers 73, 74. The fibers 3 may be supplied into the housing 1 in lumps. The spike rollers 7 then disintegrate or shredder the lumps of fibers 3 in order to ensure an even distribution of fibers 3 in the product 6 formed on the forming wire 5. The fibers pass the spike rollers 71 in the first row and then the belt screen 8 and the second row of spike rollers 72 as the fibers are sucked downwards in the forming box. In the lower run 86 of the belt screen 8, oversized fibers are retained on the belt screen 8 and returned to the upper section of the forming box for further disintegration. The retained fibers are captured on the top of the lower run 86 of the belt screen 7 which then becomes the lower surface of the upper run 85 and the fibers are suck off the belt screen 8 and the lumps of the fibers are shredded by the spike rollers one more time.

Figure 3:
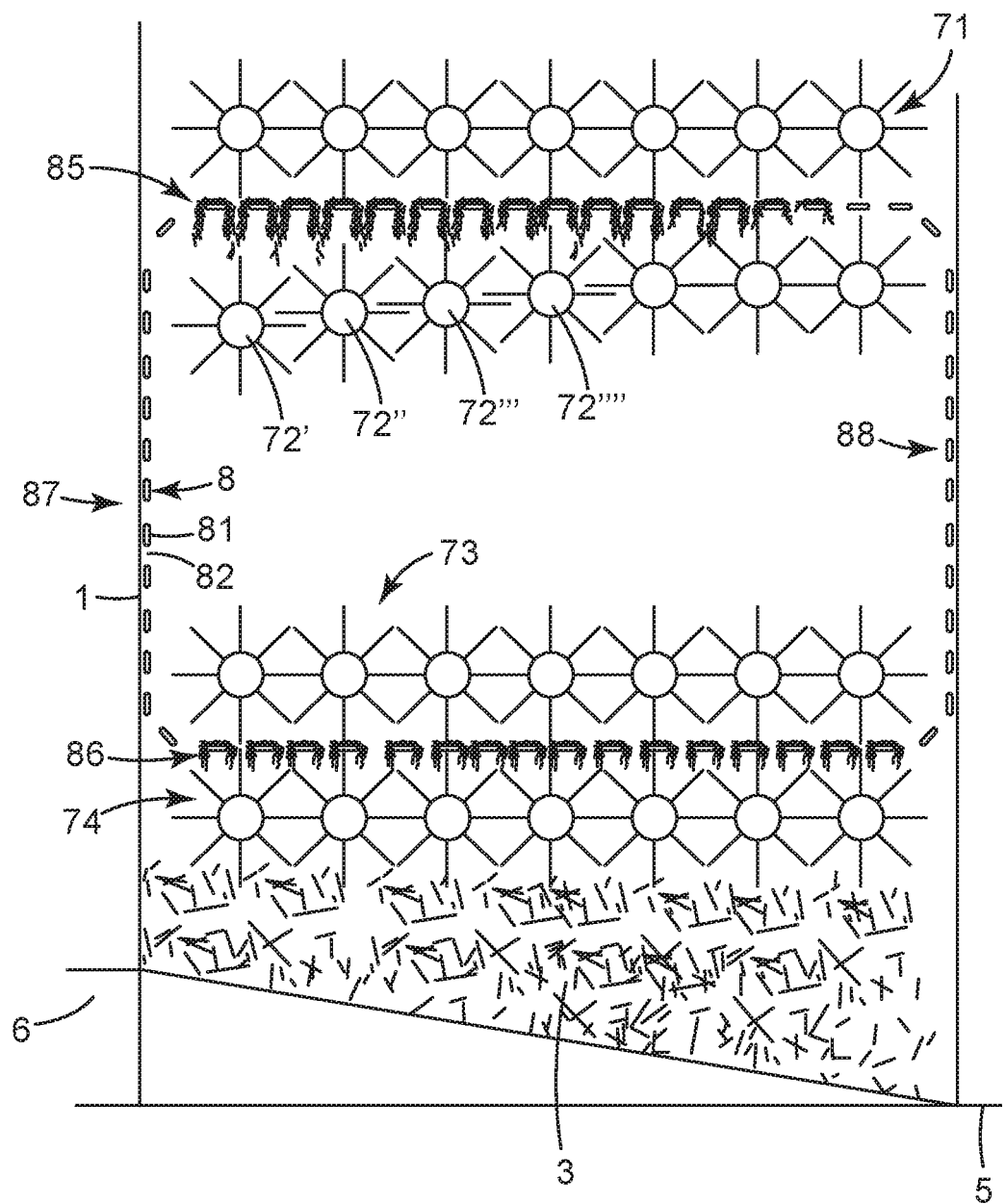
FIG. 3 shows a detailed view of the forming box shown in FIG. 2.

As shown in FIG. 3, the row of spike rollers 72 immediately below the upper run 85 of the belt screen 8 is inclined. This row 72 receives the retained, "oversized" fibers being returned from the retention below. In order to ensure that the fibers 3 are shredded efficiently in the row 72, the first spike rollers 72', 72'', 72''', 72'''' in the row 72 are provided with different distances between the axis of rotation of the individual spike rollers 72', 72'', 72''', 72'''' and the upper run 85 of the belt screen 8. The first spike roller 72' in the row is positioned with the largest distance and gradually the subsequent spike rollers 72'', 72''' and 72'''' are positioned with closer distances, so that fibers in the lumps of returned, oversized fibers are "peeled" off gently whereby it is ensured that the lumps are shredded and disintegrated rather than being sucked and dragged off the belt screen and in between two adjacent spike rollers.

The endless belt screen 8 includes closed portions 81 and openings 82 provided in a predetermined pattern. Alternatively, the belt screen 8 could be a wire mesh. By a particular pattern of openings 82 and closures 81 of the belt screen 7, a predetermined surface pattern on the fiber board 6 formed by the dry-forming process may be achieved by arranging the lower run 86 of the belt screen 8 so that it makes contact with the top surface of the fibers which are laid on the forming wire 4.

In the vertically oriented paths of travel 87, 88 one or more spike rollers (not shown) may be provided adjacent the belt screen 8 for loosing fibers on the belt screen. The configuration of the spike rollers may be chosen in accordance with the kinds of fibers which are to be air-laid by the forming box.

The bottom of the forming box may be provided with a sieve (not shown), and the belt screen 8 may accordingly be provided with brush means (not shown) for removing retained fibers. Hereby, the belt may additionally be used for cleaning the bottom sieve. The brush means may be members provided for sweeping the fibers of the upper side of the lower run path of the belt screen. Alternatively or in combination, the belt screen may be provided with means for generating a turbulent airflow stirring up the retained fibers on the sieve. In this manner, a forming box with a bottom sieve may be provided with a cleaning facility for the bottom sieve and the belt may additionally be used for preventing that the sieve is clogging up.

In the above illustrated forming box, the inlet is shown positioned above the belt screen and the spike rollers. However, it is realised that the inlet may be positioned below the upper run of the belt screen, and/or that a multiple of inlets may be provided (e.g., for supplying different types of fibers to the forming box). The spike rollers and indeed the belt screen will then assist in mixing the fibers inside the forming box.

In accordance with the present method for making mounting mats, the mat of fibers formed on the forming wire is transported out of the forming box and is then compressed—e.g. by stitch bonding or needle punching or thermal bonding of polyolefin fibers or powders or any other known method for compressing fiber mats—to a desired thickness suitable for mounting the mounting mat in the housing of a catalytic converter. The mat should be restrained such that the compressed state of the mounting mat is maintained during further handling, processing (e.g. cutting into the desired shape and size) and mounting of the mat in the catalytic converter. In the manufacturing of a catalytic converter or pollution control device, the mounting mat is disposed in a gap between the housing or casing of the pollution control device and the pollution control element, also called monolith. Typically the gap between the housing and the pollution control element will vary between 2 mm and 10 mm, for example between 3 mm and 5 mm. The gap size may be constant or may vary along the circumference of the pollution control element depending on the particular design of the pollution control device.

Fiber or fiber blends are usually conveyed from one equipment to another equipment by an air stream generated by a fan. While using this kind of transportation means a lubricant can be sprayed onto the fiber stream using a commercially available fan, so called oiler. The fiber stream might enter directly into the housing 1 of the forming chamber (FIG. 1).

If a conveyor belt is used for transportation of fibers it is possible to apply a lubricant by sparing it onto the conveyor belt carrying the fibers at any production step. The lubricant can penetrate just by gravity or gradient or capillary force into the bulk of fibers. Preferably the lubrication takes place before the forming chamber. This ensures that the lubricant will be more equally dispersed on the surface of the fibers.

Figure 4:
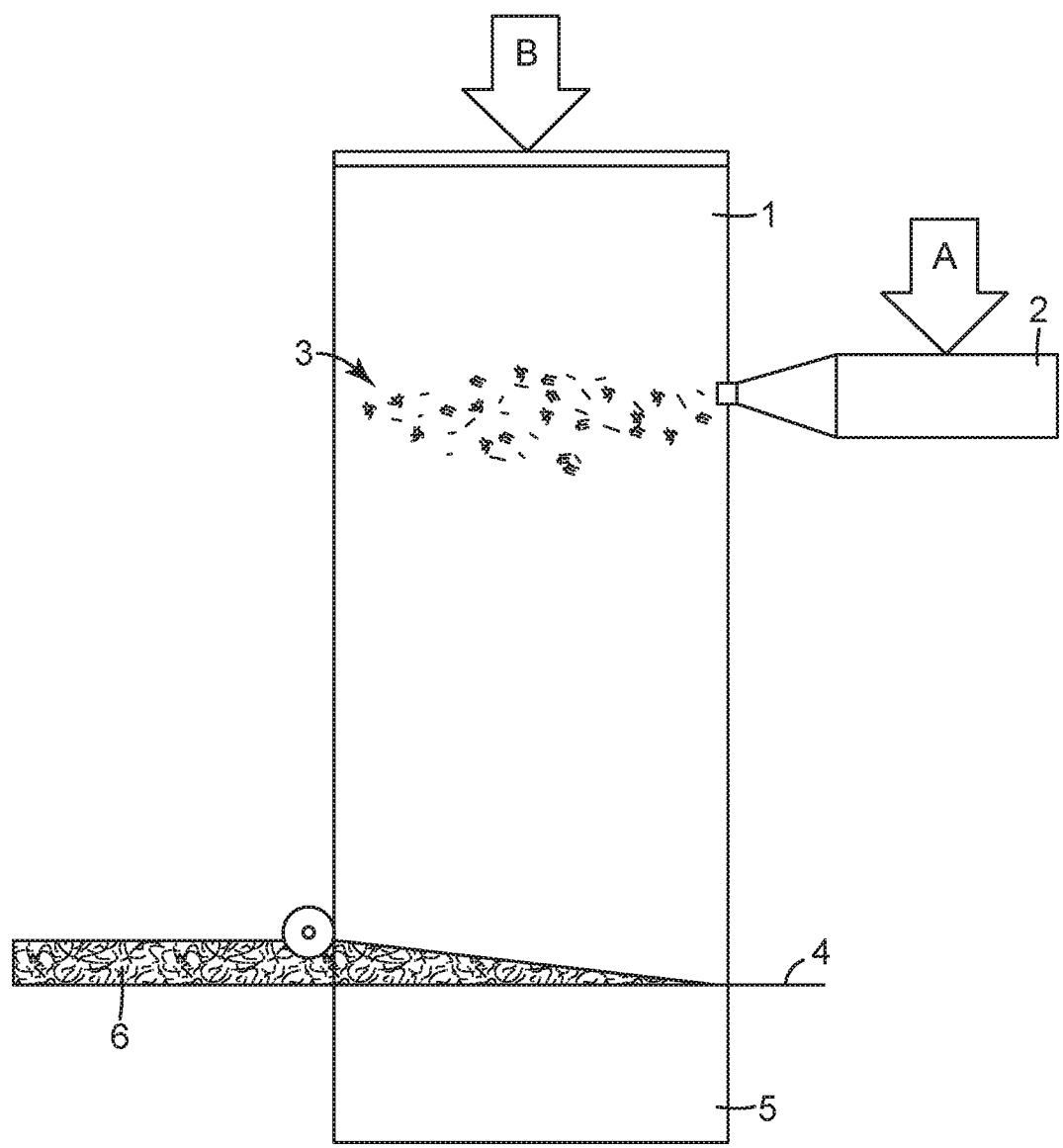
FIG. 4 shows a schematic flow chart of the method of making a mounting mat according to the invention.

FIG. 4 is a schematical drawing of embodiments of the method according to the invention. It shows the possibilities of providing a lubricant into the process of making a mounting mat. One option is to provide the lubricant by spraying it into an air stream of fibers (arrow A). The other option is to provide the lubricant by spraying it into the forming chamber (arrow B).

To cover the surface of the fiber as equal as possible it is preferred to generate small droplets. Therefore as one option a spray gun with a regulated compressed air inlet also known as 3M™ Accuspray™ System can used. This system is designed for increased atomization of high-solid clears and difficult-to-atomize coatings.

Figure 5:
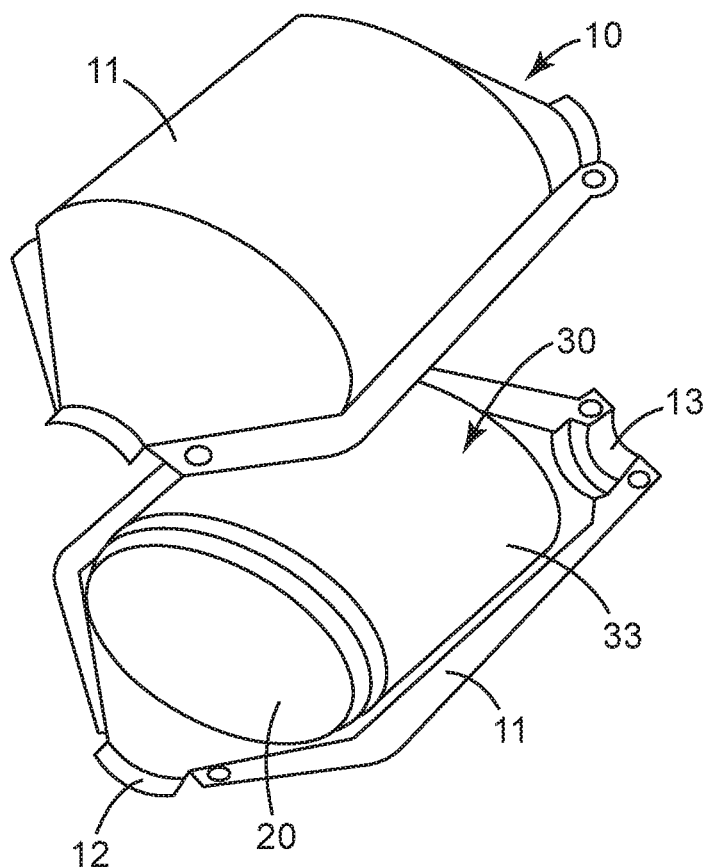
FIG. 5 shows a schematic view of one embodiment of a pollution control device.

FIG. 5 illustrates an embodiment of a pollution control device. Pollution control device 10 comprises a casing 11, typically made out of a metal material, with generally frusto-conical inlet and outlet ends 12 and 13, respectively. Disposed within the casing 11 is a pollution control element or monolith 20. Surrounding the pollution control monolith 20 is a mounting mat 30 produced in accordance with the method described above which serves to tightly but resiliently support the monolithic element 20 within the casing 11. The mounting mat 30 holds the pollution control monolith 20 in place in the casing and seals the gap between the pollution control monolith 20 and the casing 11 to thus prevent or minimize exhaust gases from by-passing pollution control monolith 20. As can be seen from FIG. 4, the exterior of the casing 11 is exposed to the atmosphere. In other words, the device 10 does not include another housing in which the casing 11 is housed. In another embodiment however, the pollution control monolith may be held in a casing and one or more of these may then be housed in a further casing as may be the casing for example I catalytic converters for trucks.

EXAMPLES

The present invention is explained in more detail with the following examples. These examples are merely for illustrative purposes and are not meant to be limiting on the scope of the appended claims.

Test Methods
Cyclical Compression Test

The test apparatus for the Cyclical Compression Test comprises the following elements:
- a Zwick/Roell Model Z010 tensile tester (available from Zwick GmbH & CoKG, Ulm, Germany) comprising a lower fixed portion with a load cell capable of measuring forces up to 10 kN and an in vertical direction from the lower fixed portion movable upper portion movable at a defined rate ("crosshead speed");
- a test fixture consisting of 2 stainless steel blocks with a base area of 6 cm×8 cm each containing heating elements capable of heating the blocks independently of each other to at least 900° C. The lower stainless steel block is firmly attached to the load cell and the upper steel block is firmly attached to the upper movable portion (crosshead) of the tensile tester so that the base areas of the blocks are positioned vertically above each other. Each stainless steel block is equipped with a thermal couple, which is located in the center of the block;
- a laser extensometer commercially available from Fiedler Optoelektronik of Lützen, Germany, which measures the open distance between the stainless steel blocks.

Mounting mat samples to be tested had a diameter of approximately 2 inches (50.8 mm) and were positioned directly on the lower stainless steel block. The gap was then closed. Compressing the mounting mat to a defined compressed density, also referred to as closed gap. The pressure exerted by the mounting mat was recorded after one minute relaxation in the closed gap position. After this both stainless steel blocks were heated with a rate of 30° C. per minute until the defined test temperature was reached. During this time the gap between the stainless steel blocks was kept constant i.e. the metal expansion was continuously compensated via the laser extensometer.

After heat-up the cycling started by opening the gap to a second defined mat density, also referred to as open gap. Then gap was closed again to the closed gap position. This cycle was repeated 1000 times. The crosshead speed during cycling was 10 millimeter per minute. The open gap cold peak pressure P0 and the closed gap hot cyclic pressure P1000 of the last cycle were recorded.

Raw Materials Used:

Isofrax 1260° C. Grade S 27 is an alkaline earth silicate wool (SiO2: 70-80 wt %, MgO 18-27 wt %) commercially available by Unifrax Ltd., UK Unexpanded Vermiculite available from 3M Company, St. Paul, Minn./U.S.A.

Trevira 255 is a bicomponent staple fiber having a core/sheath structure of polyester/polyolefin and is commercially available by Trevira GmbH, Germany Q8 Puccini 29 process oil, having a kinematic viscosity at 40° C. (measured in accordance with ASTM D445) of 29.0 $mm^2/s$, commercially available by Kuwait Petroleum GmbH, Ratingen, Germany Q8 Puccini 125 process oil, having a kinematic viscosity at 40° C. (measured in accordance with ASTM D445) of 128.6 $mm^2/s$, commercially available by Kuwait Petroleum GmbH, Ratingen, Germany Q8 Puccini 225 process oil, having a kinematic viscosity at 40° C. (measured in accordance with ASTM D445) of 222 $mm^2/s$, commercially available by Kuwait Petroleum GmbH, Ratingen, Germany Dakolub MB 9500 process oil based on an trimethylolpropan-trioleate of fatty acids, having a kinematic viscosity at 40° C. (measured in accordance with ASTM D445) of 48.0 $mm^2/s$, commercially available by Dako AG, Wiesentheid, Germany Canola Oil containing omega-6 and omega-3 fatty acids commercially available by Henry Lamotte GmbH, Germany Preparation of Mounting Mats The mounting mats (examples Ex.1 to Ex.9 and comparative examples C1 and C2) were made on a 600 mm wide non-woven-machine, built according to the principles as disclosed in WO 2009/048859.

The machine has a forming section with 2 sets of 5 top and 5 bottom spike rolls, which turn against each other. A moving belt with metal bars set in-between the pairs of spike rolls ensures that no material lumps can fall onto the forming belt.

In the current example the ceramic fibers were lubricated prior to the web forming process. For this purpose ceramic fibers were distributed on a transportation belt, passed through a preopening section and blown by the air flow originated by a fan through a pipe into the top of the forming chamber. The lubricant was applied onto the fibers during air transport using a spray gun. The sprayed fibers were collected onto the forming belt in the bottom of the forming chamber.

The lubricated fibers and the material selected for assembling the various mounting mats (examples) were fed into the machine via a transportation belt. The fibers were passed through a pre-opening section with one rotating spike roll and brought by the rotating spike roll into the top of the forming chamber.

The fibers were then collected on the forming belt, which was moving at a speed of about 1.5 m/min. After passing the forming section the mounting mats (examples) went through a hot air oven running at an oven temperature of 190° C. in order to activate the bi-component fibers. The mats, which were passed through the oven, were compressed directly after leaving the oven with a double belt press in a way that reduced the originally formed thickness.

The obtained mounting mats (examples) were then subjected to cyclic compression testing. The fiber mat composition was for all examples and comparative examples kept identical and only varied in the amount of lubricant used.
Composition of Fiber Mats (in Parts by Weight):
64.5% Isofrax fibers; 30% Vermiculite and 5.5% bi-component fibers Trevira 255. The mats were formed using the upper procedure at an oven temperature of 190° C. All mounting mats were compressed by a roller reducing the original thickness of the mats before entering the oven.

Table 1 shows an overview of all the examples and the comparative examples subjected to cyclic compression testing.

TABLE 1

| Example No. | Lubricant used | Amount used (wt %) |
|---|---|---|
| Ex. 1 | Q8 Puccini 29P | 0.4 |
| Ex. 2 | Q8 Puccini 29P | 0.8 |
| Ex. 3 | Q8 Puccini 29P | 1.8 |
| Ex. 4 | Q8 Puccini 125P | 0.9 |
| Ex. 5 | Q8 Puccini 125P | 1.8 |
| Ex. 6 | Q8 Puccini 125P | 2.3 |
| Ex. 7 | Dakolub MB 9500 | 1.3 |
| Ex. 8 | Dakolub MB 9500 | 2.9 |
| Ex. 9 | Canola Oil | 1.9 |
| C1 | none | 0 |
| C2 | Q8 Puccini 225P | 1.5 |

The P0 closed gap and P1000 open gap cyclic compression values of examples Ex.1 to Ex.9 and comparative example C1 are shown in table 2. The closed gap refers to a compressed density (also known as mount density) of 0.55 g/cm³. The open gap refers to a compressed gap of 0.50 g/cm³.

TABLE 2

| Example No. | P0 closed gap (kPa) | P 1000 open gap (kPa) |
|---|---|---|
| Ex. 1 | 270 | 12 |
| Ex. 2 | 221 | 12 |
| Ex. 3 | 220 | 12 |
| Ex. 4 | 233 | 13 |
| Ex. 5 | 223 | 12 |
| Ex. 6 | 199 | 10 |
| Ex. 7 | 224 | 16 |
| Ex. 8 | 173 | 12 |
| Ex. 9 | 188 | 13 |
| C1 | 289 | 10 |

Figure 6:
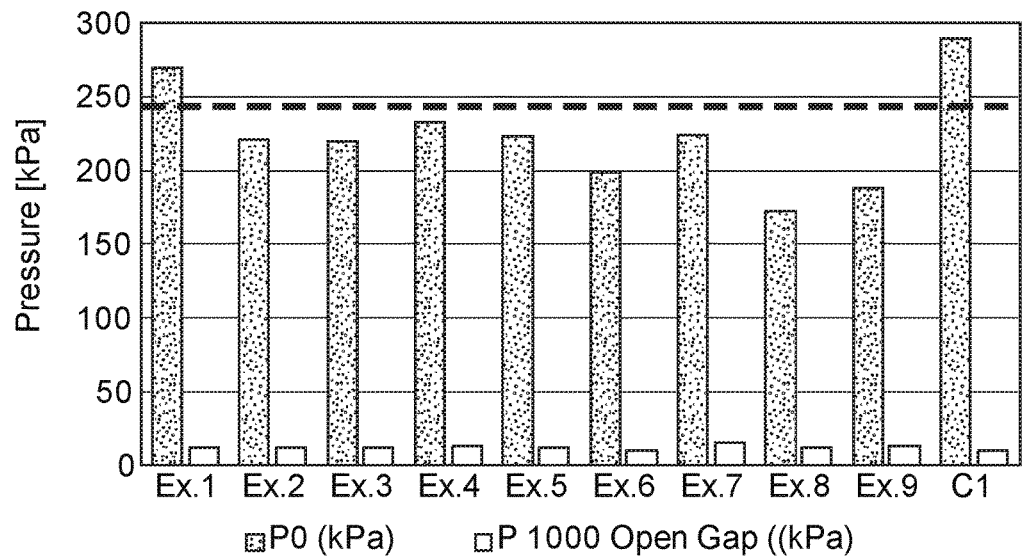
FIG. 6 shows a diagram with the results of the experiments displayed in table 2 and FIG. 7 shows a diagram with the results of the experiments displayed in table 3.
Figure 7:
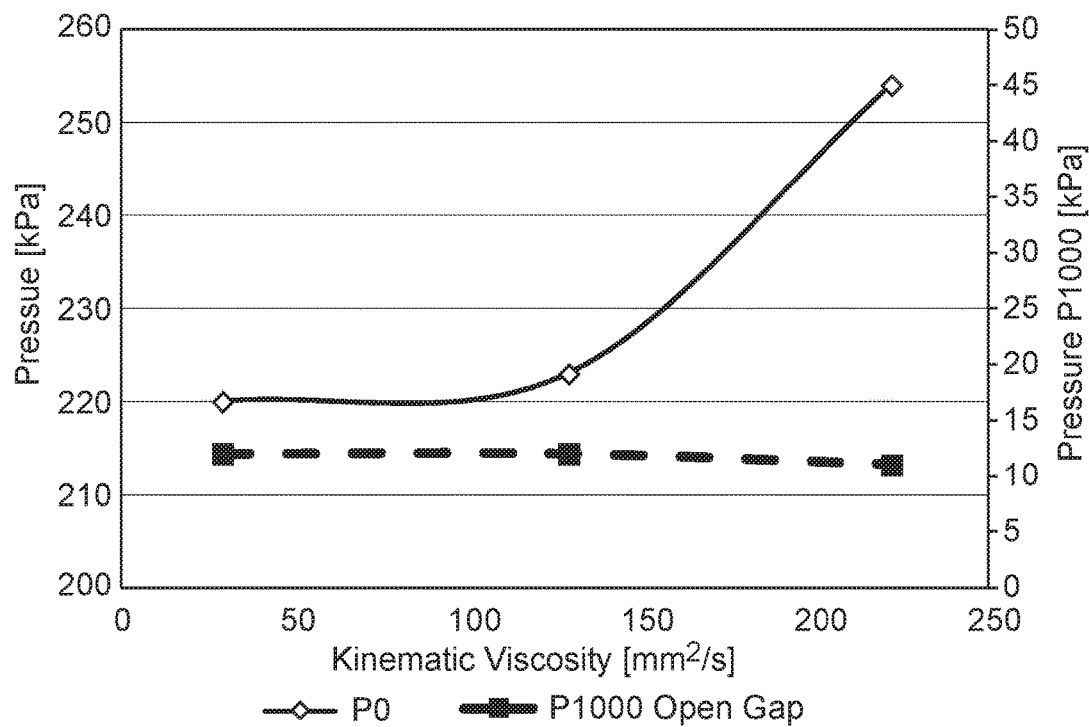

It is object of this invention to reduce the P0 closed gap values without changing the P 1000 open gap values. Table 2 shows that comparative example C1 and Ex.1, which has only 0.4% of Puccini 29P process oil added, provide P0 values that are unfavorable as they are above 240 kPa. All other examples show reduced P0 values, hereby showing that an increasing amount of lubricant leads to an increased reduction of P0 closed gap test results. Hereby—in all cases—the P 1000 open gap results—remain basically unaffected. FIG. 6 shows the above dates in a diagram.

Table 3 shows that for the selection of the lubricant the kinematic viscosity is a key selection feature besides the amount of lubricant used.

TABLE 3

| Example No. | P0 close gap (kPa) | P 1000 open gap (kPa) |
|---|---|---|
| Ex. 3 | 220 | 12 |
| Ex. 5 | 223 | 12 |
| C2 | 254 | 11 |

Results in table 3 are a comparison row between Puccini 29P and 125P at 1.8% and Puccini 225P at 1.5%. Hereby the kinematic viscosity at 40° C. increases from Puccini 29P at 29 mm²/s, to Puccini 125P at 129 mm²/s up until Puccini 225P at 222 mm²/s. Hereby the later—having the highest kinematic viscosity—delivers results above 240 kP. FIG. 6 shows the above dates in a diagram.

The invention claimed is:
1. A mounting mat made for mounting a pollution control element into a housing of a pollution control device, the mounting mat comprising:
a non-woven mat of inorganic fibers, and
a lubricant is distributed in the mounting mat to reduce the cold peak pressure of the mounting mat, and the lubricant belongs to a group consisting of:
saturated hydrocarbons (linear and/or branched and/or cyclic,
olefinically unsaturated hydrocarbons (linear and/or branched and/or cyclic),
fatty alcohols and fatty acids (linear and/or branched and saturated and/or olefinically unsaturated),
carboxylic acid esters
carbonic acid esters and/or
silicone oils and/or organofunctional silanes and/or silioxanes,
wherein the lubricant has a viscosity between 10 and 200 mm²/s at 40° C., as measured according to ASTM D445.
2. The mounting mat according to claim 1, wherein the lubricant is based on renewable resources.
3. The mounting mat according to claim 1, wherein the mounting mat include ceramic fibers, annealed melt-formed ceramic fibers, sol-gel formed ceramic fibers, polycrystal- line fibers, glass fibers, alumina-silica fibers, non-biopersistent fibers and/or combinations thereof.

4. The mounting mat according to claim 1, wherein the mounting mat is made by a dry laid process or a wet laid process.

5. The mounting mat according to claim 1, wherein the mounting mat comprises binder in an amount of 1-10 wt %.

6. The mounting mat according to claim 5, wherein the lubricant is contained in said mat in an amount of at least 0.5 wt % by weight.

7. The mounting mat according to claim 1, wherein the lubricant is contained in said mat in an amount of at least 0.5 wt % by weight.

8. The mounting mat according to claim 1, wherein the lubricant is contained in said mat in an amount of 3 wt %.

9. The mounting mat according to claim 1, wherein the mounting mat is disposed between the pollution control element and the housing.

10. A method of making a mounting mat according to claim 1 which mounting mat is made for mounting a pollution control element into a housing of a pollution control device, said method comprising:
(i) supplying inorganic fibers through an inlet of a forming box having an open bottom positioned over a forming wire to form a mat of fibers on the forming wire, the forming box having a plurality of fiber separating rollers provided in at least one row in the housing between the inlet and housing bottom for breaking apart clumps of fibers and an endless belt screen;
(ii) capturing clumps of fibers on a lower run of the endless belt beneath fiber separating rollers and above the forming wire;
(iii) conveying captured clumps of fibers on the endless belt above fiber separating rollers to enable captured clumps to release from the belt and to contact and be broken apart by the rollers;
(iv) transporting the mat of fibers out of the forming box by the forming wire;
(v) compressing the mat of fibers and restraining the mat of fibers in its compressed state thereby obtaining a mounting mat having a desired thickness suitable for mounting a pollution control element in the housing of a catalytic converter; and
(vi) providing at least one lubricant to the fibers before, during or after forming the mat,
wherein the lubricant has a viscosity between 10 and 200 mm$^2$/s at 40° C., as measured according to ASTM D445.

11. Method according to claim 10, wherein the compression step is a needle punching, stitch bonding step and/or thermal bonding.

12. Method according to claim 10, wherein the lubricant gets sprayed onto the fibers before they enter the forming chamber.

13. Method according to claim 10, wherein the lubricants gets sprayed into the forming chamber.

14. Method according to claim 10, wherein the lubricant gets sprayed onto the mat of fibers after it left the forming chamber.

15. A pollution control device comprising the mounting mat according to claim 1.

16. The mounting mat according to claim 1, wherein the mounting mat comprises binder in an amount of 3-6 wt %.

17. The mounting mat according to claim 1, wherein the lubricant is contained in said mat in an amount of at least 1.0 wt %.

18. The mounting mat according to claim 1, wherein the lubricant has a viscosity between 25 and 150 mm$^2$/s at 40° C., as measured according to ASTM D445.

19. The mounting mat according to claim 1, wherein the mounting mat comprises binder in an amount of 3-6 wt % and lubricant in an amount of at least 1.0 wt %, and the lubricant has a viscosity between 25 and 150 mm$^2$/s at 40° C., as measured according to ASTM D445.

20. A pollution control device comprising:
a pollution control element;
a housing; and
a mounting mat made for mounting the pollution control element into the housing, the mounting mat comprising:
a non-woven mat of inorganic fibers, and
a lubricant distributed in the mat to reduce the cold peak pressure of the mounting mat,
wherein the lubricant belongs to a group consisting of:
saturated hydrocarbons (linear and/or branched and/or cyclic),
olefinically unsaturated hydrocarbons (linear and/or branched and/or cyclic),
fatty alcohols and fatty acids (linear and/or branched and saturated and/or olefinically unsaturated),
carboxylic acid esters,
carbonic acid esters, and/or
silicone oils and/or silanes and/or siloxanes,
wherein the lubricant has a viscosity between 10 and 200 mm$^2$/s at 40° C., as measured according to ASTM D445.

* * * * *